United States Patent
Yabe et al.

[11] Patent Number: 6,023,991
[45] Date of Patent: Feb. 15, 2000

[54] BALL SCREW LUBRICATED WITH OIL-CONTAINING POLYMER

[75] Inventors: Toshikazu Yabe, Saitama; Ken Namimatsu, Gunma, both of Japan

[73] Assignee: NSK Ltd., Tokyo, Japan

[21] Appl. No.: 08/263,441

[22] Filed: Jun. 21, 1994

[30] Foreign Application Priority Data

Jun. 21, 1993 [JP] Japan ................................ 5-033340
Jun. 21, 1993 [JP] Japan ................................ 5-033341

[51] Int. Cl.$^7$ .................................................. F16H 55/17
[52] U.S. Cl. ............................................. 74/459; 74/89.15
[58] Field of Search .................................. 74/459, 89.15, 74/424.8 R; 384/8, 99, 96

[56] References Cited

U.S. PATENT DOCUMENTS

| | | | |
|---|---|---|---|
| 2,855,791 | 10/1958 | Hogan | 74/459 |
| 3,027,626 | 4/1962 | Murphy. | |
| 3,529,486 | 9/1970 | Galonska et al. | 74/459 |
| 3,541,011 | 11/1970 | Davis et al. | |
| 3,547,819 | 12/1970 | Davis et al. | |
| 3,729,415 | 4/1973 | Davis et al. | |
| 4,041,793 | 8/1977 | Repay et al. | 74/459 |
| 4,148,226 | 4/1979 | Benton | 74/459 |
| 4,239,632 | 12/1980 | Baile | 252/12 |
| 4,407,511 | 10/1983 | Benton et al. | 74/459 |
| 5,014,568 | 5/1991 | Schlenker | 74/459 |
| 5,134,731 | 8/1992 | Quintile et al. | 74/459 |
| 5,168,767 | 12/1992 | Morita | 74/459 |

FOREIGN PATENT DOCUMENTS

| | | |
|---|---|---|
| 47-3455 | 1/1972 | Japan. |
| 58-193182 | 12/1983 | Japan. |
| 62-134957 | 3/1987 | Japan. |
| 63-23239 | 5/1988 | Japan. |
| 63-99062 | 6/1988 | Japan. |
| 4-78358 | 3/1992 | Japan. |

*Primary Examiner*—Tamara L. Graysay
*Assistant Examiner*—David M. Fenstermacher
*Attorney, Agent, or Firm*—Sughrue, Mion, Zinn, Macpeak & Seas, PLLC

[57] ABSTRACT

A ball screw comprising a screw shaft, a ball screw nut, a plurality of balls contained in the ball screw nut which is in threadable engagement with the shaft so that it is capable of relative movement in the linear axial direction as guided by the rolling of the balls, and a lubricant-containing polymer member that is installed in the ball screw nut in contact with the balls or in slidable contact with screw grooves in the screw shaft. The lubricant seeps out of the polymer member slowly and is supplied not only to the balls but also to the screw grooves, so that it maintains the desired lubricating effect in a consistent and automatic way over an extended period of time.

23 Claims, 8 Drawing Sheets

BALL SCREW LUBRICATED WITH OIL-CONTAINING POLYMER

BACKGROUND OF THE INVENTION

The present invention relates to a ball screw, more particularly, to a ball screw that enables an oil-containing polymer to supply a lubricant automatically for an extended period to a plurality of balls rolling in the helical spaces between the screw shaft and the ball screw nut. Further, the present invention relates to a ball screw which can advantageously be used under severe environments that defy effective lubrication by conventional practices, as exemplified by very hot environments and those where dust particles, corrosive gases, water or other foreign material is present.

FIG. 19 shows a known ball screw which is lubricated with grease or lube oil packed in the spaces 4 between a screw shaft 1 and a ball screw nut 2 which is in threadable engagement with the shaft 1 via a plurality of balls 3. With a view to preventing dust particles and other foreign matter from entering the ball screw nut 2, an annular recess 5 is sometimes formed at each end of the ball screw nut 2, with a seal member 6 being fitted in the recess (to construct a seal-type ball screw).

However, the conventional ball screws which are lubricated with lube oil or grease have a problem that when used in hot environments, the lubricant flows out of the nut 2 to be exhausted so that frequent refilling is necessary.

Further, there is another problem in that if seal members 6 are installed at the ends of the nut 2 with a view to preventing the entrance of dust particles, corrosive gases, water and other foreign matter, friction or wear develops between the screw shaft 1 and each seal member 6, thereby requiring an increased torque to turn the screw.

Examined Japanese Patent Publication (kokoku) Sho. 63-23239 teaches that a paste of a mixture of a superhigh-molecular weight polyethylene and lubricating grease is packed in a ball bearing and melted by heating so that it reaches every part of its interior, followed by cooling to solidify. However, it is not appropriate for this ball bearing lubrication technology to be applied as such to ball screws.

SUMMARY OF THE INVENTION

The present invention has been accomplished under these circumstances and has an object providing a ball screw of long service life that enables an oil-containing polymer to supply a lubricant in a consistent and automatic manner for an extended period to the balls in the helical spaces between the screw shaft and the ball screw nut, whereby the screw can be lubricated satisfactorily even within a cloud of dust particles, within water, in a hot atmosphere or under any other severe environments which defy effective lubrication by conventional practices.

This object of the present invention can be attained by a ball screw providing a screw shaft having helical screw grooves in the outer circumference, a ball screw nut that is loosely fitted around the screw shaft and has screw grooves in the inner circumference that correspond to the screw grooves in the screw shaft, and a plurality of balls that circulate while rolling in the helical spaces between the screw grooves, characterized in that a lubricant-containing polymer member is provided in the ball screw nut in such a way that it contacts circulating balls.

The lubricant-containing polymer member may be adapted to act as a circulation piece if the ball screw is of the circulation piece type.

If desired, the lubricant-containing polymer member may be adapted to act as a spacer ball in the ball screw.

Further, the lubricant-containing polymer member may be adapted to act as a sheet member in combination with a circulating tube if the ball screw is of the tube circulation type.

According to another aspect of the present invention, the object of the present invention can also be attained by a ball screw providing a screw shaft having helical screw grooves in the outer circumference, a ball screw nut that is loosely fitted around the screw shaft and has screw grooves in the inner circumference that correspond to the screw grooves in the screw shaft, and a plurality of balls that roll in the helical spaces between the screw grooves, characterized in that a lubricant-containing polymer member is installed within the ball screw nut in such a way that it is in slidable contact with the surfaces of screw grooves in said screw shaft.

The lubricant-containing polymer member may be adapted to act as a seal member that is installed in at least one end portion of the ball screw nut.

Moreover, the lubricant-containing polymer member may be adapted to act as a deflector that is installed in the middle portion of the ball screw nut.

In the ball screw of the present invention, the lubricant seeps out slowly from the lubricant-containing polymer member to be supplied uniformly to the surfaces of rolling balls, or to all surfaces of the screw grooves in the screw shaft, thereby allowing the balls to be lubricated consistently over an extended period.

If the ball screw is of the circulation piece type and if the circulation piece is formed of the lubricant-containing polymer member, the lubricant is supplied automatically to the rolling and circulating balls when they pass through the circulation piece which defines the circulation channel, whereby both the circulation of the balls and their lubrication can be effectively accomplished.

In the case where the ball screw is of the tube circulation type, an opening made in a selected area of the belly of the circulation tube is covered with a sheeting formed of the lubricant-containing polymer member, whereby the rolling balls contact the sheet of the lubricant-containing polymer member when they pass through the opening, whereby the lubricant is supplied to the balls automatically.

If the lubricant-containing polymer member is used as a component that also acts as a seal member, the interior of the ball screw is isolated from the outside and, hence, the ball screw can maintain the effective lubricating action over an extended period even if it is used under severe environments, e.g., in water or a corrosive gas atmosphere.

DETAILED DESCRIPTION OF THE INVENTION

Figure 19:
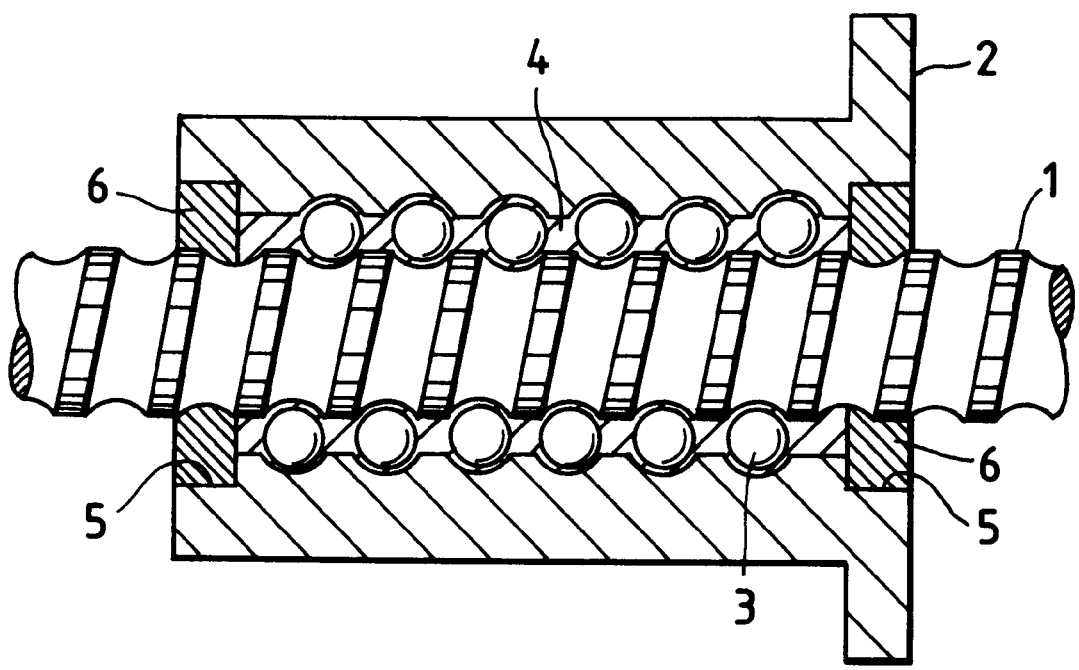
FIG. 19 is a longitudinal section of a prior art ball screw.

There will be described hereinbelow embodiments of a ball screw according to the present invention with reference to the accompanying drawings, in which the components which are identical or equivalent to those shown in FIG. 19 are identified by like reference numerals.

A lubricant-containing polymer member 10 to be used in the ball screw of the present invention is prepared by the following procedure: a polymer selected from the group of α-olefinic polymers having basically the same chemical structure such as polyethylene, polypropylene, polybutylene and polymethylpentene is mixed with a lubricant selected from among paraffinic hydrocarbon oils such as poly-α-olefinic oil, naphthenic hydrocarbon oils, mineral oils, ether oils such as dialkyldiphenylether oils, ester oils such as phthalates and trimellitates, etc., and the mixture is heated to the melting point and subsequently poured into a mold of a predetermined shape, in which it is cooled to solidify under pressure. If desired, various additives such as antioxidants, rust preventive agents, wear resisting agents, defoaming agents and extreme pressure agents may be preliminarily incorporated in the mixture.

The ball screw of a type in which the lubricant-containing polymer member 10 is also used as a seal member may specifically be constructed either by setting a screw shaft 1 of the ball screw of interest in the center of a predetermined mold or by setting a screw shaft 1 which is slightly greater in diameter by about 5 to 100 µm. This insures the clearance between the screw shaft 1 and a ball screw nut 2 to become smaller than has been achieved by the conventional seal member (the clearance has conventionally been on the order of 0.3 to 1 mm); at the same time, the film formed by the oil slowly seeping out of the lubricant-containing polymer member is capable of maintaining very effective sealing performance.

The class of the polymers listed above have the same basic structure but vary in average molecular weight, ranging from $1\times10^3$ to $5\times10^6$. Among various applicable polymers, those having comparatively low molecular weights of $1\times10^3$–$5\times10^5$ on average and those having superhigh-molecular weights of $1\times10^6$–$5\times10^6$ may be used either independently or in admixtures.

To enhance the mechanical strength of the lubricant-containing polymer member to be used in the present invention, the above-described α-olefinic polymers may be combined with any one of the following thermoplastic and thermosetting resins. Exemplary thermoplastic resins include polyamides, polycarbonates, polybutylene terephthalate, polyphenylene sulfides, polyether sulfones, polyether ether ketones, polyamideimides, polystyrenes and ABS resins. Exemplary thermosetting resins include unsaturated polyester resins, urea resins, melamine resins, phenolic resins, polyimide resins and epoxy resins. The resins listed above may be used either independently or in admixtures.

To insure that the α-olefinic polymers and other resins are dispersed in a more uniform state, suitable compatibilizers may be added as required.

Figure 1:
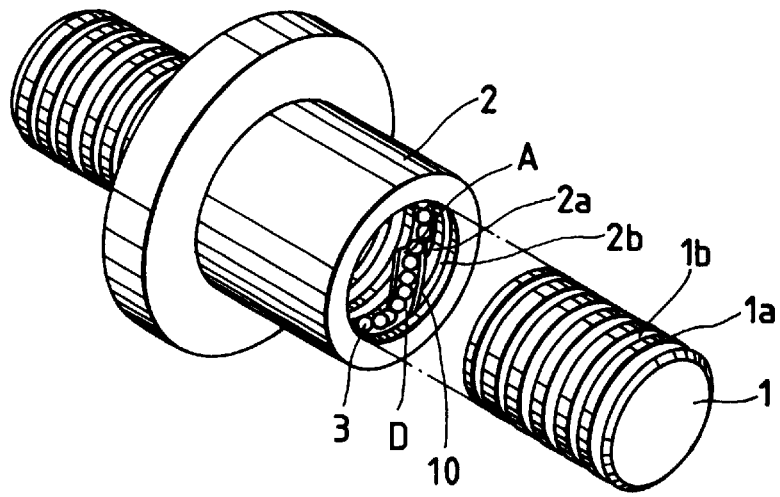
FIG. 1 is an exploded perspective view showing a ball screw according to an embodiment of the present invention.
Figure 2:
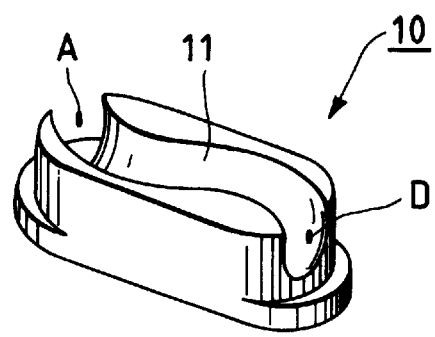
FIG. 2 is a perspective view showing the circulation piece of FIG. 1.

FIG. 1 is a perspective view of a ball screw of the circulation piece type according to a first embodiment of the present invention, and FIG. 2 is a perspective view of the circulation piece used in the ball screw. As shown, the ball screw consists of a screw shaft 1 in threadable engagement with a ball screw nut 2 via a plurality of balls 3. The screw shaft 1 has helical screw grooves 1b in the outer circumference 1a, and the ball screw nut 2 has screw grooves 2b in the inner circumference 2a that correspond to the screw grooves 1b. The ball screw nut 2 has a lubricant-containing polymer member 10 fitted on the inner surface of the cylindrical drum portion; the member 10 acts as a circulation piece having a ball circulation channel 11 for guiding the circulation of balls 3 which roll to move in the helical spaces defined by the opposing screw grooves 1b and 2b. The ball circulation channel 11 is curved generally in a S-shape so that balls 3 starting at point A advance along the channel 11, ride over the outer circumference (land areas) 1a of the screw shaft 1 and reach point D where they enter the space between groove 1b in the screw shaft and groove 2b in the ball screw nut, thus returning to the start point A. The balls repeat this circulating movement.

The lubricant-containing polymer member 10 acting as the circulation piece is prepared by molding in the following manner: a polyethylene composition consisting of 14 wt % of a low-molecular weight (mol. wt. $1\times10^3$–$5\times10^5$) polyethylene and 6 wt % of a superhigh-molecular weight polyethylene (mol. wt. $1\times10^6$–$5\times10^6$) is mixed with 80 wt % of a lubricating paraffinic hydrocarbon oil; the mixture is heated to melt and poured into a mold of a predetermined shape, with the melt being cooled to solidify under pressure.

The ball screw shown in FIG. 1 acts in the following way. When the screw shaft 1 is rotated, the balls 3 in the ball screw nut 2 roll in the helical spaces between the opposing screw grooves 1b and 2b in the direction in which the screw shaft is rotated, whereby the balls move in a circulatory manner via the ball circulation channel 11 in the lubricant-containing polymer member 10 which serves as the circulation piece. The rolling balls 3 allow the ball screw nut 2 to be advanced in a linear direction along the screw shaft 1. With the ball screw being driven in that way, the lubricant seeps slowly out of the lubricant-containing polymer member 10 fitted in the ball screw nut 2, so that the lubricant is supplied to the balls 3 when they roll along the channel 11 while contacting the polymer member 10, whereby every one of the screw grooves 1b and 2b is covered uniformly with the lubricant to assure consistent lubrication for an extended period of time. Consequently, the ball screw allows low-torque and efficient operation to be performed for an extended period without requiring a special supply of the lubricant from an external source.

Figure 3:
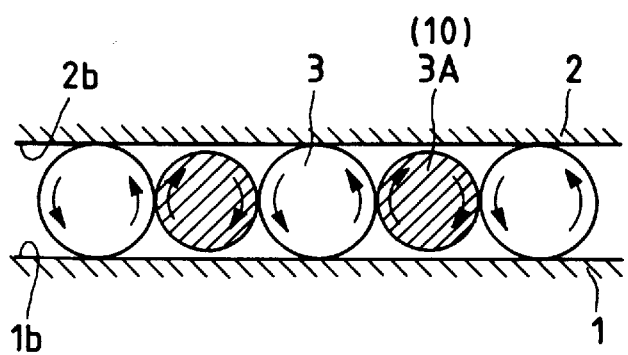
FIG. 3 is a sectional view showing schematically the essential part of a ball screw according to another embodiment of the present invention.

FIG. 3 shows a second embodiment of the present invention.

Ball screws are generally preloaded in order to eliminate the clearance in the axial direction of the screw for precise positioning and in order to achieve higher rigidity by reducing the amount of elastic displacements under an axial load. While various methods of applying a preload are available, a typical approach is to insert oversized balls 3, or balls which are slightly larger than the space defined by grooves 1a and 1b. In this case, a spacer ball 3A slightly smaller than the space between grooves 1a and 2b is inserted between every two balls 3 and allowed to rotate in contact with those balls so as to improve the operational efficiency.

In the second embodiment, the lubricant-containing polymer member 10 is used as the spacer ball 3A. The lubricant which seeps out slowly from the spacer ball 3A reaches not only the balls 3 but also the opposing screw grooves 1b and 2b in such a uniform way that consistent lubrication is assured for an extended period of time.

The lubricant-containing polymer member 10 acting as the spacer ball 3A is prepared by molding a feed that provides a polyethylene composition consisting of 10 wt % of a low-molecular weight polyethylene (mol. wt. $1\times10^3$–$5\times10^5$) and 5 wt % of a superhigh-molecular weight polyethylene (mol. wt. $1\times10^6$–$5\times10^6$) and 85 wt % of a lubricating dialkyldiphenylether oil.

Figure 4:
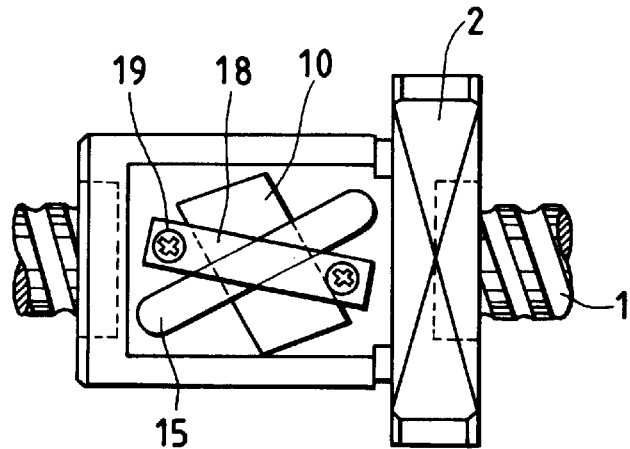
FIG. 4 is a plan view showing the external shape of a ball screw according to yet another embodiment of the present invention.
Figure 5:
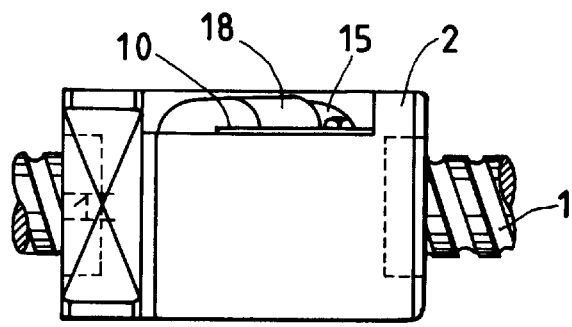
FIG. 5 is a front view of the ball screw shown in FIG. 4.
Figure 6:
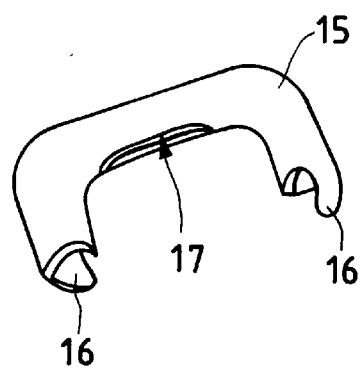
FIG. 6 is a perspective view of the circulation tube shown as a component of the ball screw in FIG. 4.

FIGS. 4 to 6 show a third embodiment of the present invention. In the third embodiment, the lubricant-containing polymer 10 in a sheet form is. combined with a circulation tube 15 for use in a ball screw of the tube circulation type. As shown in FIG. 6, the circulation tube 15 substantially formed into a U-shape includes a tubular tongue 16 formed at both ends. The ball screw nut 2 has a pair of through-holes (not shown) that extend from the outer circumference through the wall to the grooves in the inner circumference and which are spaced apart by a plurality of screw grooves. To secure the circulation tube 15, both ends are inserted into these through-holes so that it is fitted on the exterior of the ball screw nut 2; thereafter, a tube holder member 18 is clamped tightly with screws 19.

In the third embodiment, a longitudinal slit 17 is made in the underside of the middle portion of the circulation tube 15. To cover the slit 17, the seal member 10 in a sheet form is inserted between the circulation tube 15 and the outer circumference of the ball screw nut 2 and both the sheet-shaped seal member 10 and the circulation tube 15 are secured in position by the tube holder member 18.

The lubricant seeps slowly out of the sheet of seal member 10, so that when the balls 3 pass through the circulation tube 15, they contact the seal member 10 facing the slit 17, whereupon the lubricant is supplied to the balls 3, thence transferred uniformly to every one of the screw grooves 1b and 2b; as a result, consistent lubrication of the ball screw is insured for a prolonged period of time.

The lubricant-containing polymer member 10 in sheet form is prepared by molding a feed providing a polyethylene composition consisting of 10 wt % of a low-molecular weight polyethylene (mol. wt. $1\times10^3$–$5\times10^5$) and 5 wt % of a superhigh-molecular weight polyethylene (mol. wt. $1\times10^6$–$5\times10^6$) and 85 wt % of a lubricating dialkyldiphenylether oil.

Figure 7:
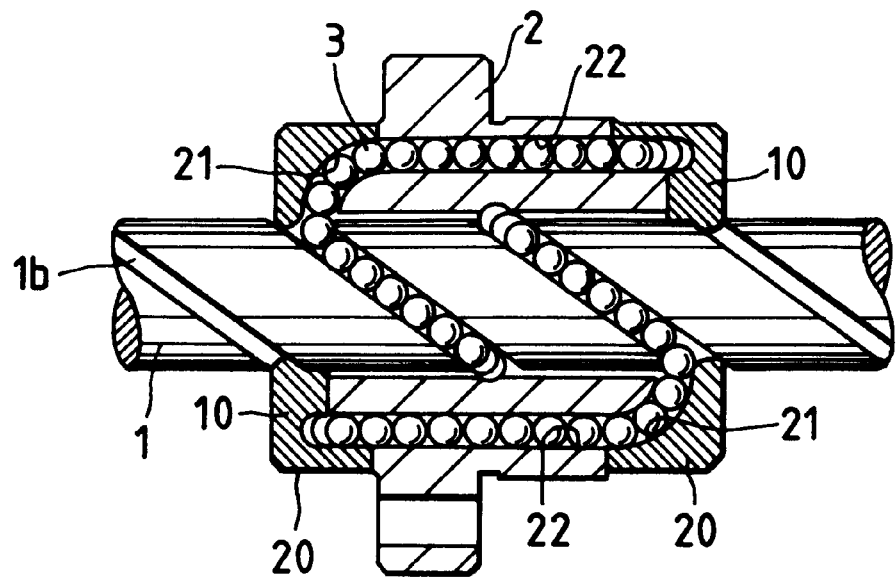
FIG. 7 is a longitudinal section of a ball screw according to a further embodiment of the present invention.
Figure 8:
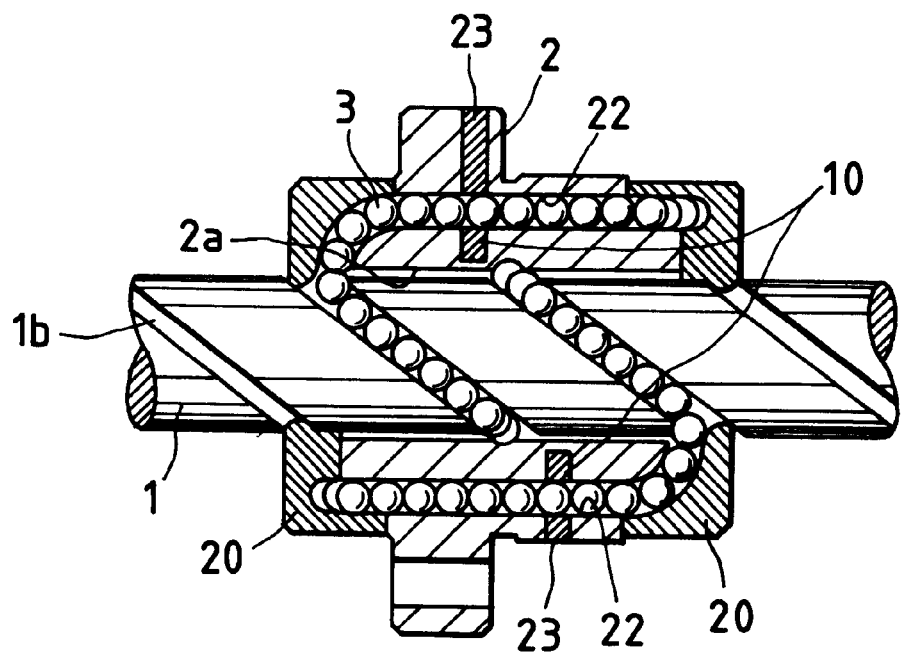
FIG. 8 is a longitudinal section of a ball screw according to a still further embodiment of the present invention.

FIGS. 7 to 9 show fourth to sixth embodiments of the present invention, in which the lubricant-containing polymer member 10 is applied to a ball screw of the end cap circulation type. This type ball screw is simple in structure and finds advantageous use as a superlarge-lead ball screw optimal for high-speed feed. As shown typically in FIG. 7, opposite ends of the ball screw nut 2 are fitted with end caps (circulation components) 20, and balls 3 circulate along a curved channel 21 in each end cap 20 and through holes 22 within the ball screw nut 2, so that they returns to the initial positions.

In the fourth embodiment shown in FIG. 7, the end caps 20 are formed of the lubricant-containing polymer member 10. The lubricant seeps slowly out of the polymer member 10, and is supplied to the balls 3 when they pass through the curved channels 21 in the end caps 20 while contacting the polymer member 10, so that the ball screw can be lubricated consistently over an extended period of time.

In the fifth embodiment shown in FIG. 8, a hole 23 that extends from the lateral side of the nut 2 of a ball screw of the end cap circulation type is made in more than one location so that the hole 23 penetrates the through hole 22 within the ball screw nut 2 to a point close to the inner circumference 2a of the ball screw nut 2. The lubricant-containing polymer member 10 is fitted through each of the holes 23. The lubricant seeping slowly out of the polymer member 10 is supplied to the balls 3 when they pass through the through holes 22 within the ball screw nut 2 while contacting the polymer member 10, so that the ball screw can be lubricated consistently over an extended period of time.

Figure 9A:
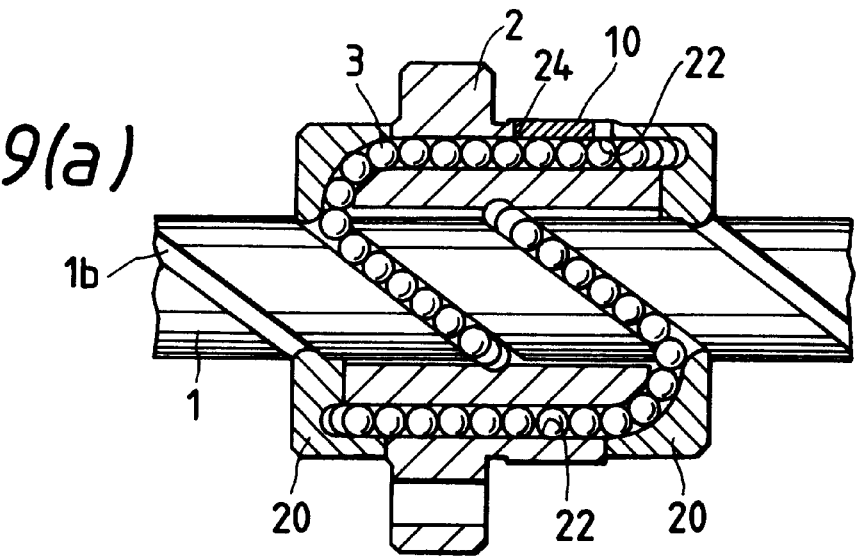
FIG. 9(a) is a longitudinal section of a ball screw according to another embodiment of the present invention.
Figure 9B:
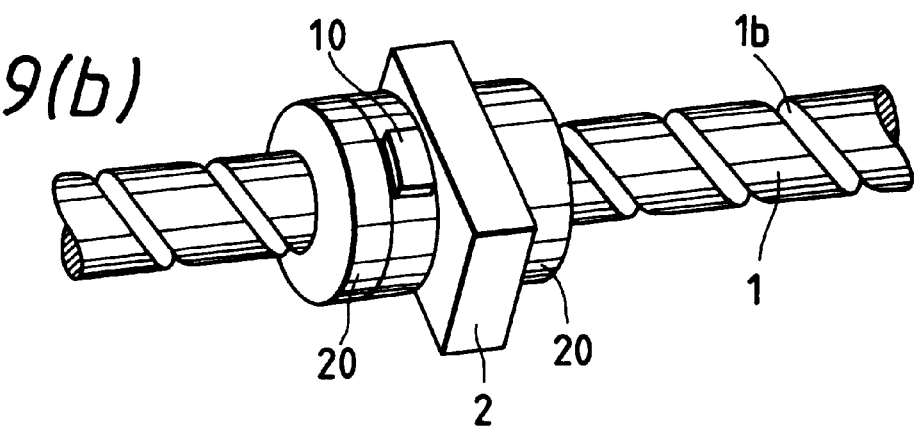
FIG. 9(b) is a perspective view showing the external shape of that ball screw.
Figure 9C:
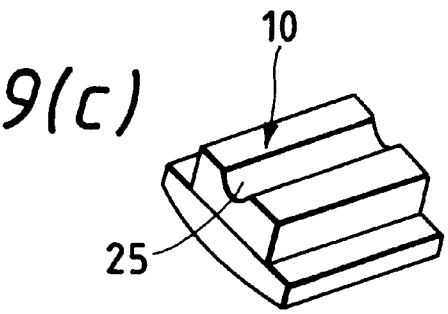
FIG. 9(c) is a perspective view of the lubricant-containing polymer member as a component of that ball screw.

In the sixth embodiment shown in FIGS. 9(a) to 9(c), a hole 24 extending to the through hole 22 within the nut 2 of a ball screw of the end cap circulation type is made in the side wall of the nut 2. The lubricant-containing polymer member 10 of the shape shown in FIG. 9(c) is fitted in the hole 24. The polymer member 10 has a groove 25 that forms part of the inner surface of the through hole 22 within the nut 2. When the balls 3 contact the inner surface of the groove 25 during their passage through the through hole 22, the lubricant seeping slowly out of the polymer member 10 is guided by the groove 25 to be supplied to the balls 3, so that the ball screw can be lubricated consistently over an extended period of time.

Figure 11:
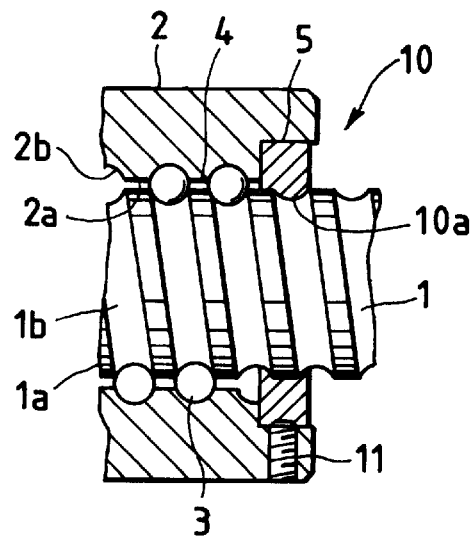
FIG. 11 is a longitudinal section of the essential part of a ball screw according to an embodiment of the present invention.

FIG. 11 is a sectional view showing the essential part of a ball screw according to a seventh embodiment of the present invention as it is applied to a seal-type ball screw.

The ball screw shown in FIG. 11 provides a screw shaft 1 that has helical screw grooves 1b in the outer circumference 1a and with which a ball screw nut 2 is in threadable engagement via a plurality of balls 3. The ball screw nut 2 has screw grooves 2b formed in the inner circumference 2a in correspondence to the screw grooves 1b in the screw shaft 1. The ball screw nut 2 also has ball circulation channel (not shown) provided in the thick-walled drum portion for guiding the circulation of balls 3 when they roll in the screw grooves 2b. A lubricant-containing polymer member 10 is fitted in an annular recess 5 at an end face of the ball screw nut 2 and secured thereto by a set screw 11.

The lubricant-containing polymer member 10 is prepared by molding in the following manner: a polyethylene composition consisting of 14 wt % of a low-molecular weight polyethylene (mol. wt. $1 \times 10^3$–$5 \times 10^5$) and 6 wt % of a superhigh-molecular weight polyethylene (mol. wt. $1 \times 10^6$–$5 \times 10^6$) is mixed with 80 wt % of a paraffinic hydrocarbon oil; the mixture is heated to the melting point and poured into a mold of a predetermined shape, with the melt being cooled to solidify under pressure. The inner circumference 10a of the polymer member 10 is formed in conformity with the helical screw grooves 1b in the screw shaft 1 so that it contacts with these grooves 1b.

The ball screw shown in FIG. 11 acts in the following way. As the screw shaft 1 is rotated, the balls 3 in the ball screw nut 2 roll in the helical spaces between the opposing screw grooves 1b and 2b in the direction in which the screw shaft is rotated, whereby the balls move in a circulatory manner via the ball circulation channel (not shown). The rolling balls 3 allow the ball screw nut 2 to be advanced in a linear direction along the screw shaft 1. With the ball screw being driven in that way, the lubricant seeps out slowly from the lubricant-containing polymer 10 at an end of the ball screw nut 2, so that it is supplied to the screw grooves 1b in the screw shaft 1 and transferred uniformly to all the balls 3 rolling in those screw grooves 1b and to the screw grooves 2b in the ball screw nut, thereby assuring consistent lubrication for an extended period of time. Consequently, secures screw allows low-torque and efficient operation to be performed for an extended period without requiring a special supply of the lubricant from an external source.

The lubricant-containing polymer member 10 also acts as a seal member to seal the end portions of the ball screw nut 2, thereby isolating its interior from the exterior atmosphere. This insures that even if the exterior atmosphere is severe as exemplified by water or corrosive gases, the interior of the nut 2 is protected against these severe environments, whereby the ball screw can maintain the effective lubricating action over an extended period of time.

Figure 12:
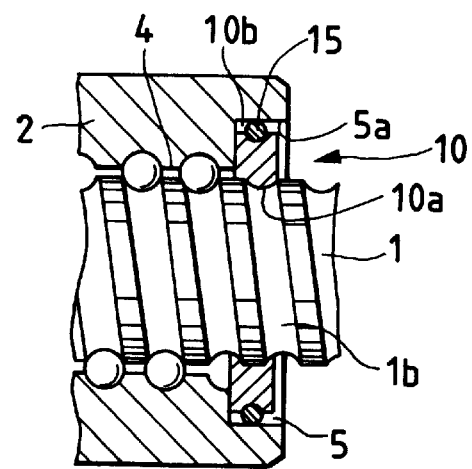
FIG. 12 is a longitudinal section of the essential part of a ball screw according to another embodiment of the present invention.

FIG. 12 shows an eighth embodiment of the present invention.

In the eighth embodiment, a garter spring 15 is inserted between the inner circumference 5a of the annular recess 5 at an end face of the ball screw nut 2 and the outer circumference 10b of the lubricant-containing polymer member 10. The spring 15 exerts a pressure on the polymer member 10 so that it is biased radially toward the screw grooves 1b in the screw shaft 1 and, therefore, even if the inner circumference 10a of the polymer member 10 wears as a result of prolonged operation, the polymer member 10 maintains the necessary degree of contact with the screw shaft 1 for securing satisfactory lubrication.

The lubricant-containing polymer member 10 used in the eighth embodiment under consideration is prepared by molding a feed that provides a polyethylene composition consisting of 10 wt % of a low-molecular weight polyethylene (mol. wt. $1 \times 10^3$–$5 \times 10^5$) and 5 wt % of a superhigh-molecular weight polyethylene (mol. wt. $1 \times 10^6$–$5 \times 10^6$) and 85 wt % of a lubricating dialkyldiphenylether oil.

Figure 13:
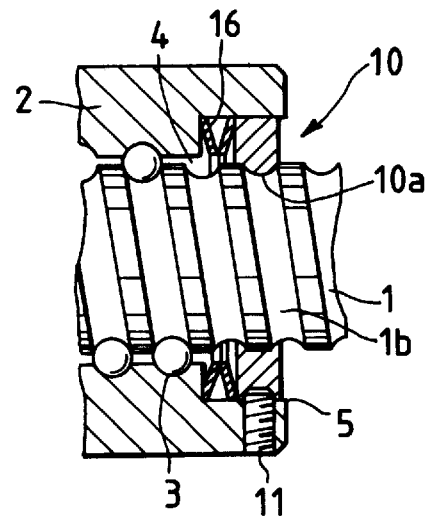
FIG. 13 is a longitudinal section of the essential part of a ball screw according to still another embodiment of the present invention.

FIG. 13 shows a ninth embodiment of the present invention.

In the ninth embodiment, the lubricant-containing polymer member 10 shown in FIG. 11 is preloaded in the thrust direction. To this end, the recess 5 at an end of the ball screw nut 2 is made deep enough to provide a space that permits a coned disc spring (or a coil spring) 16 to be fitted at the backside of the lubricant-containing polymer member 10. The spring 16 exerts a pressure so that the polymer member 10 is biased parallel to the screw shaft 1 and toward the exterior of the nut 2, whereby the inner circumference 10a is pressed axially against the surfaces of the screw grooves 1b in the screws shaft; this insures effective contact between the polymer member 10 and the screw shaft 1 even if the inner circumference 10a has worn.

The lubricant-containing polymer member 10 used in the ninth embodiment under consideration is prepared by molding in the following manner: a polyethylene composition consisting of 14 wt % of a low-molecular weight polyethylene (mol. wt. $1 \times 10^3$–$5 \times 10^5$) and 6 wt % of a superhigh-molecular weight polyethylene (mol. wt. $1 \times 10^6$–$5 \times 10^6$) is mixed with 80 wt % of a lubricating paraffinic hydrocarbon oil; the mixture is heated to the melting point and poured into a mold of a predetermined shape, with the melt being cooled to solidify under pressure.

Figure 14:
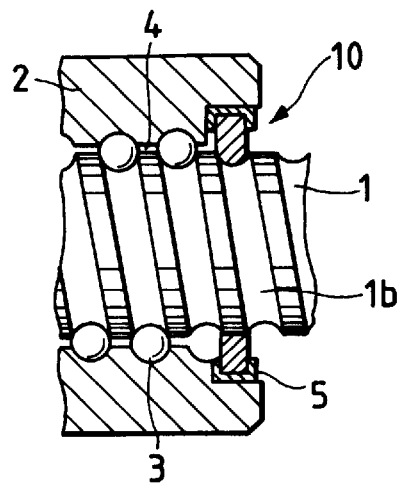
FIG. 14 is a longitudinal section of the essential part of a ball screw according to yet another embodiment of the present invention.
Figure 15:
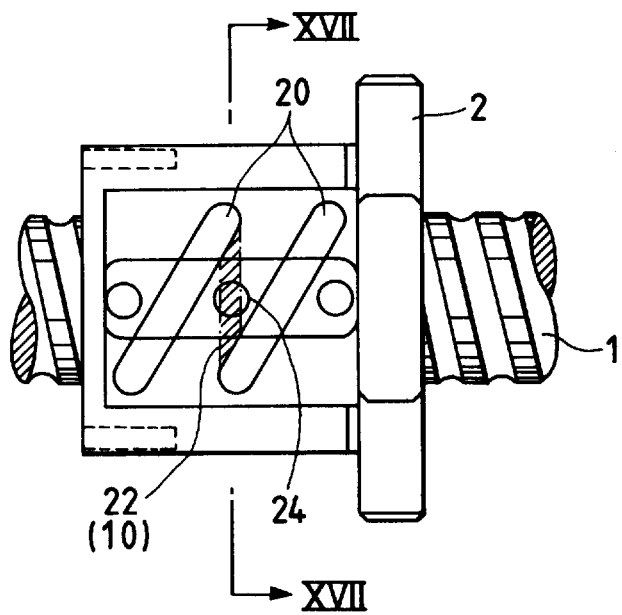
FIG. 15 is a diagram showing the external shape of a ball screw according to a further embodiment of the present invention.

FIG. 14 shows a tenth embodiment of the present invention.

In the tenth embodiment, a brush seal which is generally used in rolled ball screws of a seal type is constituted of the lubricant-containing polymer member 10 and incorporated as a component of ball screw. While the mechanism of action and the resulting advantages of the tenth embodiment are essentially the same as those described with reference to FIG. 11, it is worth particular mention that the brush seal provides positive contact with the outer circumference of the screw shaft 1 of the rolled ball screw which usually does not have as high of a dimensional precision as the product to be machined and that, therefore, the desired sealing and lubricating actions can be accomplished.

The lubricant-containing polymer member 10 used in the tenth embodiment under consideration is prepared by molding in the following manner: a polyethylene composition consisting of 14 wt % of a low-molecular weight polyethylene (mol. wt. $1 \times 10^3$–$5 \times 10^5$) and 6 wt % of a superhigh-molecular weight polyethylene (mol. wt. $1 \times 10^6$–$5 \times 10^6$) is mixed with 80 wt % of a lubricating paraffinic hydrocarbon oil; the mixture is heated to the melting point and poured into a mold of a predetermined shape, with the melt being cooled to solidify under pressure.

FIGS. 15 to 18 show an eleventh embodiment of the present invention.

In the eleventh embodiment, the lubricant-containing polymer member 10 is used as a "deflector" 22. The deflector is a device that is conventionally fitted in a screw groove 2b in the circulating portion of the ball screw nut 2 for two typical purposes, one for backing up the tubular tongue portions 21 of circulation tubes 20 in a ball screw of the tubular circulation channel type and the other for scooping balls 3.

Figure 16:
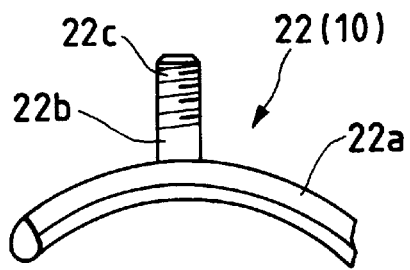
FIG. 16 is a perspective view showing the essential part of the lubricant-containing polymer member as a deflector which is incorporated in the ball screw shown in FIG. 15.
Figure 17:
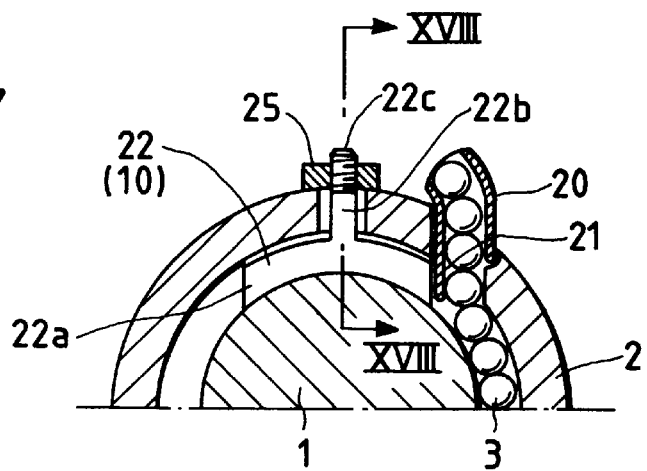
FIG. 17 is a section taken along line XVII—XVII of FIG. 15.
Figure 18:
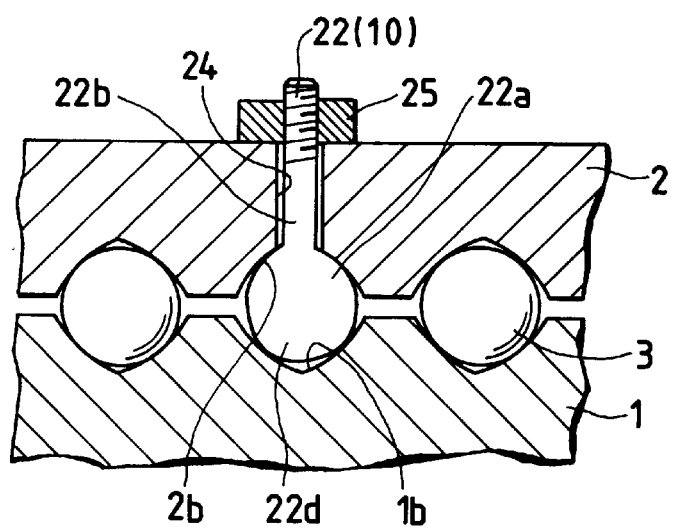
FIG. 18 is a longitudinal section of the essential part of the ball screw as taken along line XVIII—XVIII of FIG. 17.

As shown in FIG. 16, the lubricant-containing polymer member 10 serving as deflector provides a curved portion 22a which is to be fitted in a screw groove and a mounting portion 22b which is a branch from the portion 22a, with the tip of the mounting portion 22b being formed as a male screw. The portion 22a has a polygonal cross-sectional shape as shown in FIG. 18, and its angular portion 22d is in contact with the surface of a screw groove 1b in the screw shaft 1. The mounting portion 22b is inserted into a radial through-hole 24 formed in the circulating portion of the ball screw nut 2 and a nut 25 is threaded onto the male screw 22c projecting from the outer circumference of the ball screw nut 2, whereby the polymer member 10 or deflector 22 is secured to the ball screw nut 2.

With the lubricant-containing polymer member 10 (deflector 22) being thus fitted in a screw groove 2b in the inner circumference of the ball screw nut 2, the lubricant seeps out slowly from that polymer member 10 to diffuse into the area of contact with screw grooves 1b in the rotating screw shaft 1, so that it is supplied to the screw grooves 1b and thence transferred uniformly to all the balls 3 rolling in those grooves 1b and to the screw grooves 2b in the ball screw nut, thereby assuring consistent lubrication for an extended period of time.

In the eleventh embodiment just described above, as well as the inherent functions of the deflector which backs up the tubular tongue portions 21 and scoops the balls 3, the lubricant-containing polymer member 10 insures the lubricant to be supplied automatically over an extended period. It should also be mentioned that in a crucial situation where all of the balls 3 are lost, the polymer member 10 serving as the deflector fitted in a screw groove 1b of the screw shaft 1 acts as a female screw, thereby providing a failsafe feature acting as a sliding screw.

The lubricant-containing polymer member 10 is prepared by molding in the same manner as in the previous embodiments: a polyethylene composition consisting of 14 wt % of a low-molecular weight polyethylene (mol. wt. $1 \times 10^3$–$5 \times 10^{-5}$) and 6 wt % of a superhigh-molecular weight polyethylene (mol. wt. $1 \times 10^3$–$5 \times 10^5$) is mixed with 80 wt % of a lubricating paraffinic hydrocarbon oil; the mixture is heated to the melting point and poured into a mold of a predetermined shape, with the melt being cooled to solidify under pressure.

It should be mentioned here that in each of the previous embodiments, the spaces between the ball screw nut 2 and the screw shaft 1 within the nut 2 (excepting the helical ball rolling channels defined by the opposing screw grooves 1b and 2b) may be filled with a conventional lubricant such as grease or lube oil.

Figure 10:
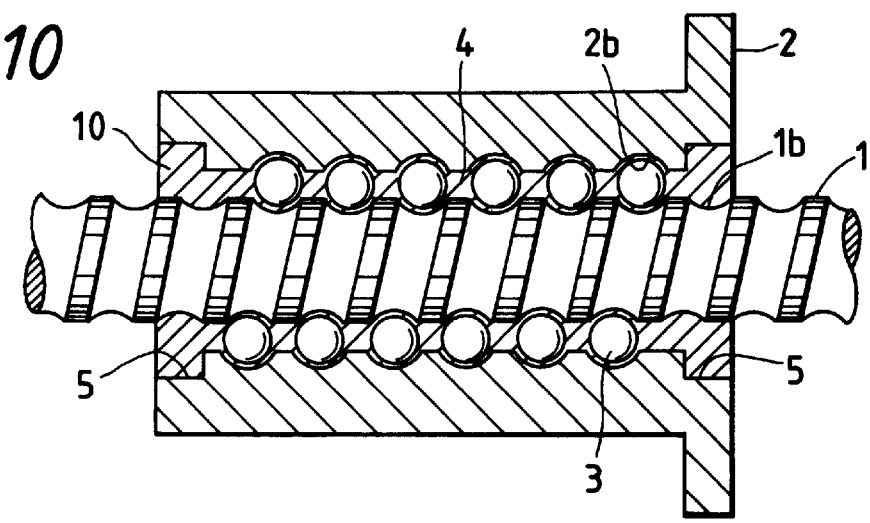
FIG. 10 is a longitudinal section of a ball screw according to yet another embodiment of the present invention.

If desired, rather than using conventional lubricants such as grease or lube oils, the spaces within the ball screws of the previous embodiments may be filled with a mixture of the feed polymers for the lubricant-containing polymer member and the specified lubricant, which mixture is heated to the melting point and then cooled to solidify. By so doing, a structure is obtained in which the entire part of the internal space 4 is filled with the lubricant-containing polymer member. In this case, the structure shown in FIG. 10 may be adopted, in which the lubricant-containing polymer member 10 is packed to fill even recesses 5 which are formed at opposite ends of the ball screw nut 2 to permit the installation of seal members. This insures both end portions of the nut to serve two purposes; one is to act as seal members and the other is to lubricate not only the balls 3 but also the ball screw grooves 1b and 2b directly.

Depending on the conditions under which the ball screw is to be used, the lubricant-containing polymer member 10 may be installed in only one of the recesses 5 at opposite ends of the ball screw nut 2.

If desired, the lubricant-containing polymer member 10 used in the embodiments shown in FIGS. 11 to 14 which is adapted to act as a seal member may be used in combination with the lubricant-containing polymer member 10 which is adapted to act as "deflector" 22.

As described above, the ball screw of the present invention has the lubricant-containing polymer member to be fitted in the ball screw nut in such a way that it contacts the balls rolling in the helical spaces between the screw shaft and the screw nut. Because of this structural feature, the lubricant slowly seeps out of the polymer member to be supplied automatically to the surfaces of the balls. Since the balls are rotating, the lubricant is also supplied uniformly to every one of the screw grooves coming in contact with the balls. Consequently, the ball screw of the present invention can be effectively lubricated for an extended period and its service life is prolonged accordingly.

Further, the ball screw of the present invention has the lubricant-containing polymer member installed in the interior of the ball screw nut in such a way that it is in slidable contact with the surfaces of screw grooves in the screw shaft. When the ball screw is operated, the lubricant seeps slowly out of the polymer member so that it is supplied automatically and uniformly to the surfaces of contact between the ball screw grooves and the rolling balls, thereby assuring satisfactory lubrication over an extended period. Furthermore, the polymer member protects the interior of the ball screw nut by isolating it effectively from the exterior, whereby the ball screw can perform for its extended service life even within a cloud of dust particles, in water, in a hot atmosphere or under other severe environments which defy effective lubrication by conventional practices.

What is claimed is:

1. A ball screw lubricated with an oil-containing polymer, comprising:
    a screw shaft including a helical first screw groove formed in an outer circumference thereof;
    a ball screw nut loosely fitted around said screw shaft, said ball screw nut including a second screw groove formed in an inner circumference thereof confronted with said first screw groove in said screw shaft;
    a plurality of balls rolling to circulate in a helical space between said first and second screw grooves; and
    a lubricant-containing polymer member installed in said ball screw nut in contact with said balls, wherein said polymer member comprises a circulation piece having a ball circulation channel guiding a circulation of said balls rolling in the helical space defined by said opposing first and second screw grooves.

2. The ball screw of claim 1, wherein said polymer member is packed to fill an internal space between said ball screw nut and said screw shaft and to fill recesses which are formed at opposite ends of said ball screw nut.

3. A ball screw lubricated with an oil-containing polymer, comprising:
    a screw shaft including a helical first screw groove formed in an outer circumference thereof;
    a ball screw nut loosely fitted around said screw shaft, said ball screw nut including a second screw groove formed in an inner circumference thereof confronted with said first screw groove in said screw shaft;
    a plurality of balls rolling to circulate in a helical space between said first and second screw grooves; and
    a lubricant-containing polymer member installed in said ball screw nut in contact with said balls, wherein said polymer member comprises a spacer ball smaller than the helical space between said first and second screw grooves, and said spacer ball is inserted between two of said balls so as to rotate in contact with said balls.

4. The ball screw of claim 3, wherein said polymer member fills an internal space between said ball screw nut and said screw shaft and recesses which are formed at opposite ends of said ball screw nut.

5. A ball screw lubricated with an oil-containing polymer, comprising:
- a screw shaft including a helical first screw groove formed in an outer circumference thereof;
- a ball screw nut loosely fitted around said screw shaft, said ball screw nut including a second screw groove formed in an inner circumference thereof confronted with said first screw groove in said screw shaft;
- a plurality of balls rolling to circulate in a helical space between said first and second screw grooves; and
- a lubricant-containing polymer member installed in said ball screw nut in contact with said balls; and
- a circulation tube fitted on an outer circumference of said ball screw nut for circulating said balls and a tube holder member for securing said circulation tube, said circulation tube includes a longitudinal slit formed in an underside of a middle portion thereof, wherein said polymer member comprises a seal member formed into a sheet shape, and said seal member is inserted between said circulation tube and the outer circumference of said ball screw nut for covering the slit.

6. The ball screw of claim 5, wherein said polymer member fills an internal space between said ball screw nut and said screw shaft and recesses which are formed at opposite ends of said ball screw nut.

7. A ball screw lubricated with an oil-containing polymer, comprising:
- a screw shaft including a helical first screw groove formed in an outer circumference thereof;
- a ball screw nut loosely fitted around said screw shaft, said ball screw nut including a second screw groove formed in an inner circumference thereof confronted with said first screw groove in said screw shaft;
- a plurality of balls rolling to circulate in a helical space between said first and second screw grooves; and
- a lubricant-containing polymer member installed in said ball screw nut in contact with said balls; and
- end caps fitted on opposite ends of said ball screw nut for circulating said balls along a curved channel formed in said respective end caps and along a through hole formed within said ball screw nut, wherein said ball screw nut includes a hole extending from an outer circumference thereof so that said hole penetrates the through hole formed within said ball screw nut to a point close to the inner circumference of said ball screw nut, and said polymer member is fitted through said hole to contact said balls.

8. The ball screw of claim 7, wherein said polymer member comprises end caps fitting opposite ends of said ball screw nut for circulating said balls along a curved channel formed in said respective end caps and along the through hole.

9. The ball screw of claim 7, wherein said polymer member is fitted through the through hole to contact said balls and said polymer member has a groove forming part of an inner surface of the through hole.

10. The ball screw of claim 7, wherein said polymer member fills an internal space between said ball screw nut and said screw shaft and recesses which are formed at opposite ends of said ball screw nut.

11. A ball screw lubricated with an oil-containing polymer, comprising:
- a screw shaft including a helical first screw groove formed in an outer circumference thereof;
- a ball screw nut loosely fitted around said screw shaft, said ball screw nut including a second screw groove formed in an inner circumference thereof confronted with said first screw groove in said screw shaft;
- a plurality of balls rolling to circulate in a helical space between said first and second screw grooves;
- a lubricant-containing polymer member installed in said ball screw nut in slidable contact with said first screw groove in said screw shaft, wherein said polymer member is fitted in an annular recess formed at an end face of said ball screw nut; and
- a garter spring inserted between an inner circumference of the annular recess and an outer circumference of said polymer member so that said garter spring radially biases said polymer member toward said first screw groove in said screw shaft.

12. The ball screw of claim 11, wherein said polymer member fills an internal space between said ball screw nut and said screw shaft and recesses which are formed at opposite ends of said ball screw nut.

13. A ball screw lubricated with an oil-containing polymer, comprising:
- a screw shaft including a helical first screw groove formed in an outer circumference thereof;
- a ball screw nut loosely fitted around said screw shaft, said ball screw nut including a second screw groove formed in an inner circumference thereof confronted with said first screw groove in said screw shaft;
- a plurality of balls rolling to circulate in a helical space between said first and second screw grooves;
- a lubricant-containing polymer member installed in said ball screw nut in slidable contact with said first screw groove in said screw shaft, wherein said polymer member is fitted in an annular recess formed at an end face of said ball screw nut; and
- a spring fitted between an inner circumference of the annular recess and a backside surface of said polymer member so that said spring axially biases said polymer member parallel to said screw shaft and toward an exterior of said ball screw nut.

14. The ball screw of claim 13, wherein said polymer member fills an internal space between said ball screw nut and said screw shaft and recesses which are formed at opposite ends of said ball screw nut.

15. A ball screw lubricated with an oil-containing polymer, comprising:
- a screw shaft including a helical first screw groove in an outer circumference thereof;
- a ball screw nut loosely fitted around said screw shaft, said ball screw nut including a second screw groove in an inner circumference thereof confronted with said first screw groove in said screw shaft;
- a plurality of balls rolling to circulate in a helical space between said first and second screw grooves; and
- a lubricant-containing polymer member installed in said ball screw nut in slidable contact with said first screw groove in said screw shaft, wherein said polymer member comprises a brush seal which is fitted in an annular recess formed at an end face of said ball screw nut.

16. The ball screw of claim 15, wherein said polymer member fills an internal space between said ball screw nut and said screw shaft and recesses which are formed at opposite ends of said ball screw nut.

17. A ball screw lubricated with an oil-containing polymer, comprising:
- a screw shaft including a helical first screw groove in an outer circumference thereof;

a ball screw nut loosely fitted around said screw shaft, said ball screw nut including a second screw groove in an inner circumference thereof confronted with said first screw groove in said screw shaft;

a plurality of balls rolling to circulate in a helical space between said first and second screw grooves;

a lubricant-containing polymer member installed in said ball screw nut in slidable contact with said first screw groove in said screw shaft, wherein said polymer member comprises a deflector fitted in said second screw groove of said ball screw nut; and a circulation tube fitted on an outer circumference of said ball screw nut for circulating said balls in cooperation with the deflector, wherein the circulation tube includes a tubular tongue formed at both ends and backed up by the deflector.

18. The ball screw of claim 17, wherein said polymer member fills an internal space between said ball screw nut and said screw shaft and recesses which are formed at opposite ends of said ball screw nut.

19. A ball screw lubricated with an oil-containing polymer, comprising:

a screw shaft including a helical first screw groove in an outer circumference thereof;

a ball screw nut loosely fitted around said screw shaft, said ball screw nut including a second screw groove in an inner circumference thereof confronted with said first screw groove in said screw shaft;

a plurality of balls rolling to circulate in a helical space between said first and second screw grooves; and a lubricant-containing polymer member installed in said ball screw nut in contact with said balls, wherein said ball screw nut includes a through hole therein, and said polymer member comprises end caps fitting opposite ends of said ball screw nut for circulating said balls along a curved channel formed in said respective end caps and along the through hole.

20. A ball screw lubricated with an oil-containing polymer, comprising:

a screw shaft including a helical first screw groove in an outer circumference thereof;

a ball screw nut loosely fitted around said screw shaft, said ball screw nut including a second screw groove in an inner circumference thereof confronted with said first screw groove in said screw shaft;

a plurality of balls rolling to circulate in a helical space between said first and second screw grooves;

a lubricant-containing polymer member installed in said ball screw nut in contact with said balls; and end caps fitting opposite ends of said ball screw nut for circulating said balls along a curved channel formed in said respective end caps and along a through hole formed within said ball screw nut, wherein said polymer member is fitted through the through hole to contact said balls and said polymer member has a groove forming part of an inner surface of the through hole.

21. A ball screw lubricated with an oil-containing polymer, comprising:

a screw shaft including a helical first screw groove formed in an outer circumference thereof;

a ball screw nut loosely fitted around said screw shaft, said ball screw nut including a second screw groove formed in an inner circumference thereof confronted with said first screw groove in said shaft;

a plurality of balls rolling to circulate in a helical space between said first and second screw grooves; and a lubricant-containing polymer member installed in said ball screw nut in contact with said balls; and end caps fitted on opposite ends of said ball screw nut for circulating said balls along a curved channel formed in said respective end caps and along a through hole formed within said ball screw nut, wherein said ball screw nut includes a hole extending from an outer circumference thereof so that said hole penetrates the through hole formed within said ball screw nut, and said polymer member is fitted in said hole to contact said balls.

22. A ball screw lubricated with an oil-containing polymer, comprising:

a screw shaft including a helical first screw groove formed in an outer circumference thereof;

a ball screw nut loosely fitted around said screw shaft, said ball screw nut including a second screw groove formed in an inner circumference thereof confronted with said first screw groove in said screw shaft;

a plurality of balls rolling to circulate in a helical space between said first and second screw grooves; and a lubricant-containing polymer member installed in said ball screw nut in contact with said balls, wherein said polymer member comprises a spacer smaller than the helical space between said first and second screw grooves, and said spacer is inserted between two of said balls so as to be in contact with said balls.

23. A ball screw lubricated with an oil-containing polymer, comprising:

a screw shaft including a helical first screw groove formed in an outer circumference thereof;

a ball screw nut loosely fitted around said screw shaft, said ball screw nut including a second screw groove formed in an inner circumference thereof confronted with said first screw groove in said screw shaft;

a plurality of balls rolling to circulate in a helical space between said first and second screw grooves; and a lubricant-containing polymer member installed in said ball screw nut in slidable contact with said first screw groove in said screw shaft, wherein said polymer member is fitted in an annular recess formed at an end face of said ball screw nut;

wherein an elastic member is inserted between an inner circumference of the annular recess and an outer circumference of said polymer member so that said elastic member radially biases said polymer member toward said first screw groove in said screw shaft.

* * * * *